United States Patent
Okamura et al.

(10) Patent No.: US 9,856,175 B2
(45) Date of Patent: Jan. 2, 2018

(54) SINTERED COMPACT AND CUTTING TOOL (71) Applicants: SUMITOMO ELECTRIC HARDMETAL CORP., Itami-shi (JP); Sumitomo Electric Industries, Ltd., Osaka-shi (JP)

(72) Inventors: Katsumi Okamura, Itami (JP); Mayu Danda, Itami (JP); Satoru Kukino, Itami (JP)

(73) Assignees: SUMITOMO ELECTRIC HARDMETAL CORP., Itami-shi (JP); Sumitomo Electric Industries, Ltd., Osaka-shi (JP)

( * ) Notice: Subject to any disclaimer, the term of this patent is extended or adjusted under 35 U.S.C. 154(b) by 0 days.

(21) Appl. No.: 15/324,182

(22) PCT Filed: Jan. 26, 2016

(86) PCT No.: PCT/JP2016/052127
§ 371 (c)(1),
(2) Date: Jan. 5, 2017

(87) PCT Pub. No.: WO2016/194398
PCT Pub. Date: Dec. 8, 2016

(65) Prior Publication Data
US 2017/0197885 A1 Jul. 13, 2017

(30) Foreign Application Priority Data
May 29, 2015 (JP) ................................. 2015-110670

(51) Int. Cl.
*C04B 35/5831* (2006.01)
*C04B 35/488* (2006.01)
(Continued)

(52) U.S. Cl.
CPC ........ *C04B 35/5831* (2013.01); *B23B 27/148* (2013.01); *B23C 5/20* (2013.01);
(Continued)

(58) Field of Classification Search
CPC ............ C04B 35/5831; C04B 35/4885; B23B 27/148
See application file for complete search history.

(56) References Cited

U.S. PATENT DOCUMENTS 8,814,965 B2 * 8/2014 Yokoshi ................ C04B 35/119
51/293
2010/0313489 A1 12/2010 Teramoto et al.
(Continued)

FOREIGN PATENT DOCUMENTS

JP 2013-039668 A 2/2013
JP 2014-520063 A 8/2014
(Continued)

OTHER PUBLICATIONS

International Search Report in counterpart International Application No. PCT/JP2016/052127, dated Mar. 1, 2016.

*Primary Examiner* — Karl Group
(74) *Attorney, Agent, or Firm* — Venable LLP; Michael A. Sartori; Miguel A. Lopez

(57) ABSTRACT

A sintered compact according to the present invention includes: a first material that is cubic boron nitride; a second material that is an oxide of zirconium; and a third material that is an oxide of aluminum, the second material including cubic $ZrO_2$ and ZrO, the third material including $\alpha$-$Al_2O_3$, and the sintered compact satisfying the following relation:

$0.9 \leq I_{zro2}(111)/I_{al}(110) \leq 30$; and $0.3 \leq I_{zro}(111)/I_{al}(110) \leq 3$, (Continued)

where $I_{al}(110)$, $I_{zro2}(111)$, and $I_{zro}(111)$ respectively represent X-ray diffraction intensities of a (110) plane of the $\alpha$-$Al_2O_3$, a (111) plane of the cubic $ZrO_2$, and a (111) plane of the ZrO.

9 Claims, 3 Drawing Sheets (51) Int. Cl.
B23B 27/14 (2006.01)
B23C 5/20 (2006.01)
C04B 35/63 (2006.01)
C04B 35/626 (2006.01)
C04B 35/645 (2006.01)

(52) U.S. Cl.
CPC ...... *C04B 35/4885* (2013.01); *C04B 35/6261* (2013.01); *C04B 35/6264* (2013.01); *C04B 35/6303* (2013.01); *C04B 35/645* (2013.01); *B23B 2224/04* (2013.01); *B23B 2226/125* (2013.01); *B23C 2224/04* (2013.01); *B23C 2226/125* (2013.01); *B23C 2228/49* (2013.01); *C04B 2235/3217* (2013.01); *C04B 2235/3244* (2013.01); *C04B 2235/386* (2013.01); *C04B 2235/5436* (2013.01)

(56) References Cited

U.S. PATENT DOCUMENTS

| | | |
|---|---|---|
| 2012/0208006 A1 | 8/2012 | Okamura et al. |
| 2012/0304544 A1* | 12/2012 | Yokoshi ............... C04B 35/119 51/295 |
| 2012/0329632 A1 | 12/2012 | Malik et al. |
| 2013/0079215 A1 | 3/2013 | Okamura et al. |
| 2017/0197886 A1* | 7/2017 | Danda ............... C04B 35/5831 |
| 2017/0233295 A1* | 8/2017 | Ishii ................... C04B 35/5831 |

FOREIGN PATENT DOCUMENTS

| | | |
|---|---|---|
| WO | 2008/087940 A1 | 7/2008 |
| WO | 2011/059020 A1 | 5/2011 |
| WO | 2012/029440 A1 | 3/2012 |
| WO | 2012/057183 A1 | 5/2012 |
| WO | 2012/057184 A1 | 5/2012 |

* cited by examiner

SINTERED COMPACT AND CUTTING TOOL

TECHNICAL FIELD

The present invention relates to a sintered compact and a cutting tool including the sintered compact.

BACKGROUND ART

Conventionally, since cubic boron nitride (hereinafter, also referred to as "cBN") has a high hardness, a sintered compact obtained by sintering cubic boron nitride together with a binder such as $ZrO_2$ or $Al_2O_3$ has been used for tools such as a cutting tool (WO 2008/087940 (Patent Document 1), WO 2011/059020 (Patent Document 2), WO 2012/029440 (Patent Document 3), and WO 2012/057184 (Patent Document 4)).

CITATION LIST

Patent Document

PTD 1: WO 2008/087940
PTD 2: WO 2011/059020
PTD 3: WO 2012/029440
PTD 4: WO 2012/057184

SUMMARY OF INVENTION

Technical Problem

Since it has been known that $ZrO_2$ known as the above-described binder provides a high toughness to the sintered compact, attempt has been made to obtain a higher toughness by providing a high concentration of $ZrO_2$. However, as described in Patent Document 2, when a high concentration of $ZrO_2$ is contained, wear resistance is deteriorated, disadvantageously.

Accordingly, it has been considered that for applications requiring high wear resistance, toughness cannot be improved by providing a high concentration of $ZrO_2$.

The present invention has been made in view of such a circumstance, and has an object to provide a sintered compact having both high toughness and excellent wear resistance.

Solution to Problem

A sintered compact according to one embodiment of the present invention includes: a first material that is cubic boron nitride; a second material that is an oxide of zirconium; and a third material that is an oxide of aluminum, the second material including cubic $ZrO_2$ and $ZrO$, the third material including $\alpha$-$Al_2O_3$, the sintered compact satisfying the following relation:

$$0.9 \leq I_{zro2}(111)/I_{al}(110) \leq 30; \text{ and}$$

$$0.3 \leq I_{zro}(111)/I_{al}(110) \leq 3,$$

where $I_{al}(110)$, $I_{zro2}(111)$, and $I_{zro}(111)$ respectively represent X-ray diffraction intensities of a (110) plane of the $\alpha$-$Al_2O_3$, a (111) plane of the cubic $ZrO_2$, and a (111) plane of the ZrO.

Advantageous Effects of Invention

According to the above-described configuration, both high toughness and excellent wear resistance can be obtained.

DESCRIPTION OF EMBODIMENTS

Description of Embodiment of the Present Invention

First, embodiments of the present invention are listed and described.

[1] A sintered compact according to one embodiment of the present invention includes: a first material that is cubic boron nitride; a second material that is an oxide of zirconium; and a third material that is an oxide of aluminum, the second material including cubic $ZrO_2$ and $ZrO$, the third material including $\alpha$-$Al_2O_3$, the sintered compact satisfying the following relation:

$$0.9 \leq I_{zro2}(111)/I_{al}(110) \leq 30; \text{ and}$$

$$0.3 \leq I_{zro}(111)/I_{al}(110) \leq 3,$$

where $I_{al}(110)$, $I_{zro2}(111)$, and $I_{zro}(111)$ respectively represent X-ray diffraction intensities of a (110) plane of the $\alpha$-$Al_2O_3$, a (111) plane of the cubic $ZrO_2$, and a (111) plane of the ZrO. This sintered compact can have both high toughness and excellent wear resistance.

[2] The $I_{al}(110)$, the $I_{zro2}(111)$ and the $I_{zro}(111)$ preferably satisfy the following relations:

$$1.1 \leq I_{zro2}(111)/I_{al}(110) \leq 10; \text{ and}$$

$$1 \leq I_{zro}(111)/I_{al}(110) \leq 2.5,$$

Accordingly, higher toughness and more excellent wear resistance can be obtained.

[3] The cubic $ZrO_2$ preferably includes partially stabilized $ZrO_2$. Accordingly, the above-described characteristics can be obtained sufficiently.

[4] The cubic $ZrO_2$ has preferably $Al_2O_3$ and $Y_2O_3$ dissolved in a solid state. Accordingly, the above-described characteristics can be obtained sufficiently.

[5] The sintered compact preferably includes 20 volume % to 80 volume % of the first material. Accordingly, sufficiently high toughness and excellent wear resistance can be obtained.

[6] The sintered compact preferably includes 30 volume % to 60 volume % of the first material. Accordingly, sufficiently higher toughness and more excellent wear resistance can be obtained.

[7] The sintered compact preferably further includes a fourth material, wherein the fourth material is preferably at least one selected from a group consisting of magnesium oxide, cerium oxide, yttrium oxide, and hafnium oxide. Accordingly, sintering property is improved and strength of the sintered compact is improved.

[8] Preferably, the sintered compact further includes a fifth material, wherein the fifth material is at least one compound composed of (i) at least one element selected from a group consisting of a group 4 element, a group 5 element, a group 6 element in a periodic table, Al, and Si, and (ii) at least one element selected from a group consisting of carbon, nitrogen, and boron. Also in this way, sintering property is improved and strength of the sintered compact is improved.

[9] An embodiment of the present invention is also directed to a cutting tool including any one of the sintered compacts described above.

Details of Embodiment of the Present Invention

The following describes an embodiment (hereinafter, referred to as "the present embodiment") of the present invention more in detail.

<Sintered Compact>

Conventionally, $ZrO_2$ has been used as a binder to be sintered together with cBN to provide a sintered compact. Since it has been known that such $ZrO_2$ provides a high toughness to the sintered compact, attempt has been made to obtain a higher toughness by providing a high concentration of $ZrO_2$. However, when a high concentration of $ZrO_2$ is contained, wear resistance is deteriorated, disadvantageously. Accordingly, it has been considered that for applications requiring high wear resistance, toughness cannot be improved by providing a high concentration of $ZrO_2$.

However, according to research conducted by the present inventor, it has been found that both high toughness and excellent wear resistance can be provided by employing specific conditions.

The sintered compact of the present embodiment has been completed based on such a knowledge, and includes: a first material that is cubic boron nitride; a second material that is an oxide of zirconium; and a third material that is an oxide of aluminum, the second material including cubic $ZrO_2$ and ZrO, the third material including $\alpha\text{-}Al_2O_3$, and the sintered compact satisfying the following relation:

$$0.9 \leq I_{zro2}(111)/I_{al}(110) \leq 30; \text{ and}$$

$$0.3 \leq I_{zro}(111)/I_{al}(110) \leq 3,$$

where $I_{al}(110)$, $I_{zro2}(111)$, and $I_{zro}(111)$ respectively represent X-ray diffraction intensities of a (110) plane of the $\alpha\text{-}Al_2O_3$, a (111) plane of the cubic $ZrO_2$, and a (111) plane of the ZrO.

Such a sintered compact may include any other component(s) as long as the sintered compact includes the first material, the second material, and the third material. Examples of the any other component(s) include a fourth material, a fifth material, and the like as described below; however, the component(s) are not limited to these. Moreover, such a sintered compact may include an inevitable impurity as long as the sintered compact exhibits a desired effect. Of course, such a sintered compact may include only the three materials, i.e., the first material, the second material, and the third material.

The following describes each of the components of such a sintered compact.

<First Material>

The first material included in the sintered compact of the present embodiment is cubic boron nitride. Preferably, such cubic boron nitride has an average particle size of 0.1 μm to 10 μm. If the average particle size is less than 0.1 μm, the cubic boron nitride is likely to be aggregated to result in a tendency of insufficient sintering when mixed with other powder (binder such as the second material or the third material). If the average particle size is more than 10 μm, strength of the sintered compact tends to be decreased.

Preferably, the sintered compact contains 20 volume % to 80 volume % of the cubic boron nitride (not less than 20 volume % and not more than 80 volume %; it should be noted that when a numerical range is indicated using the word "to" in the present application, the range includes the numerical values of the upper limit and the lower limit). When the ratio of the cubic boron nitride is less than 20 volume %, hardness is decreased to presumably result in decreased wear resistance. On the other hand, when the ratio of the cubic boron nitride is more than 80 volume %, wear resistance and chipping resistance may be decreased. A more preferable ratio of the cubic boron nitride is 30 volume % to 60 volume %.

It should be noted that the average particle size of the cubic boron nitride can be found as follows. That is, the sintered compact is subjected to a CP (Cross Section Polisher) process using an ion beam, thereby forming a smooth cross section. The cross section is observed with a scanning electron microscope (SEM), and an equivalent circle diameter of the cubic boron nitride is calculated through a binarization process using image analysis software and can be employed as the average particle size.

Moreover, the content of the cubic boron nitride can be found as follows. That is, an area of the cubic boron nitride is measured by using image analysis software to perform a binarization process onto a reflection electron image obtained through the measurement of the CP processed surface with the scanning electron microscope (SEM), and an area ratio of the cubic boron nitride can be regarded as the content (volume %) thereof.

<Second Material>

The second material included in the sintered compact of the present embodiment is an oxide of zirconium, and includes cubic $ZrO_2$ and ZrO. Thus, a feature of the second material lies in that the second material includes not only $ZrO_2$ but also ZrO. Although detailed mechanism is unknown, when a specific amount of ZrO is included as defined by a below-mentioned X-ray diffraction intensity, wear resistance is not deteriorated even if a high concentration of $ZrO_2$ is contained, thereby achieving both excellent wear resistance and high toughness provided by the high concentration of $ZrO_2$.

It should be noted that this $ZrO_2$ may have a small amount of a rare earth oxide such as yttrium oxide in addition to aluminum oxide, calcium oxide, and magnesium oxide dissolved in a solid state, and $ZrO_2$ may generally include so-called partially stabilized $ZrO_2$. Here, the term "partially stabilized $ZrO_2$" has the conventionally known meaning, and typically refers to $ZrO_2$ in which cubic and tetragonal crystals become stable or metastable at a room temperature by dissolving an oxide other than zirconia in a solid state to decrease oxygen vacancy in the structure to result in stabilization. Unless otherwise described particularly, $ZrO_2$ including the small amount of the other compound as described above will be described as "$ZrO_2$".

In the present embodiment, cubic $ZrO_2$ preferably includes the above-described partially stabilized $ZrO_2$, and particularly suitably consists of the partially stabilized $ZrO_2$. In this way, the above-described characteristics can be sufficiently obtained. Moreover, the cubic $ZrO_2$ has $Al_2O_3$ and $Y_2O_3$ dissolved in a solid state, as the oxides other than zirconia. Accordingly, the above characteristics can be particularly sufficiently obtained.

Such a second material normally has an average particle size of 0.01 μm to 0.1 μm.

It should be noted that the average particle size and content of the second material can be found by the same method as the method for the first material.

<Third Material>

The third material included in the sintered compact of the present embodiment is an oxide of aluminum, and includes α-$Al_2O_3$ (an aluminum oxide having an α-type crystal structure). It is considered that this third material is contributed to high hardness and high strength of the sintered compact.

Examples of the oxide of aluminum include not only α-$Al_2O_3$ but also γ-$Al_2O_3$ and the like.

Such a third material normally has an average particle size of 0.1 μm to 1 μm.

It should be noted that the average particle size and content of the third material can be found by the same method as the method for the first material.

<X-Ray Diffraction Intensity>

A feature of the sintered compact of the present embodiment lies in that the sintered compact of the present embodiment satisfies the following relation:

$$0.9 \leq I_{zro2}(111)/I_{al}(110) \leq 30; \text{ and}$$

$$0.3 \leq I_{zro}(111)/I_{al}(110) \leq 3,$$

where $I_{al}(110)$, $I_{zro2}(111)$, and (111) respectively represent X-ray diffraction intensities of a (110) plane of the α-$Al_2O_3$, a (111) plane of the cubic $ZrO_2$, and a (111) plane of the ZrO.

Such an X-ray diffraction intensity can be measured using an ordinary X-ray diffractometer, and device or measurement condition therefor are not particularly limited.

Here, the relation "$0.9 \leq I_{zro2}(111)/I_{al}(110) \leq 30$" indirectly represents a quantitative ratio of α-$Al_2O_3$ and cubic $ZrO_2$. As described above, conventionally, it has been considered that a high concentration of $ZrO_2$ contained results in deteriorated wear resistance as indicated in, for example, Patent Document 2, and the upper limit of $I_{zro2}(111)/I_{al}(110)$ has been set at about 0.60. Hence, the relation "$0.9 \leq I_{zro2}(111)/I_{al}(110) \leq 30$" indicates that the content of $ZrO_2$ (cubic $ZrO_2$) is much higher than that in the conventional sintered compact.

On the other hand, the relation "$0.3 \leq I_{zro}(111)/I_{al}(110) \leq 3$" indirectly represents a quantitative ratio of α-$Al_2O_3$ and ZrO, and the sintered compact including such a high content of ZrO has not also known conventionally.

That is, the above two relations indicate that the sintered compact of the present embodiment includes a much higher content of $ZrO_2$ and a higher content of ZrO than those of the conventional sintered compact.

When $I_{zro2}(111)/I_{al}(110)$ is less than 0.9, toughness is not sufficiently improved, whereas when $I_{zro2}(111)/I_{al}(110)$ is more than 30, the hardness of the sintered compact is decreased, disadvantageously. Moreover, when $I_{zro}(111)/I_{al}(110)$ is less than 0.3, the sintering becomes insufficient and chipping resistance is decreased, whereas when $I_{zro}(111)/I_{al}(110)$ is more than 3, hardness of the sintered compact is decreased, disadvantageously.

The above two relations more preferably satisfy the following relations:

$$1.1 \leq I_{zro2}(111)/I_{al}(110) \leq 10; \text{ and}$$

$$1 \leq I_{zro}(111)/I_{al}(110) \leq 2.5.$$

It should be noted that the content of $ZrO_2$ and the content of ZrO in the sintered compact are not simply defined using "volume %" or "mass %" but are indicated using the ratio of X-ray diffraction intensities because it is difficult to clearly distinguish $ZrO_2$ from ZrO using a structure image such as a secondary electron image or reflection electron image for determining "volume %" or "mass %".

<Fourth Material>

The sintered compact of the present embodiment can further include a fourth material in addition to the first material, the second material, and the third material. Such a fourth material is preferably at least one selected from a group consisting of magnesium oxide, cerium oxide, yttrium oxide, and hafnium oxide. The sintered compact including such a fourth material has improved sintering property and more improved strength.

Preferably, such a fourth material has an average particle size of 0.05 μm to 5 μm. If the average particle size is less than 0.05 μm, the fourth material is likely to be aggregated to result in a tendency of insufficient sintering when mixed with other powder. If the average particle size is more than 5 μm, the strength of the sintered compact tends to be decreased due to grain growth during the sintering.

Moreover, 5 volume % to 50 volume % of the fourth material is preferably contained in the sintered compact. When the ratio of the fourth material is less than 5 volume %, the strength of the sintered compact may not be sufficiently improved. On the other hand, when the ratio of the fourth material is more than 50 volume %, the ratio of the high-hardness cBN is decreased to presumably result in decreased hardness of the sintered compact. A more preferable ratio of the fourth material is 10 volume % to 30 volume %.

It should be noted that the average particle size and content of the fourth material can be found by the same method for the method for the first material.

<Fifth Material>

The sintered compact of the present embodiment may further include a fifth material in addition to the first material, the second material, and the third material. The fifth material may be included in the sintered compact together with the fourth material.

Such a fifth material is preferably at least one compound composed of (i) at least one element selected from a group consisting of a group 4 element (Ti, Zr, Hf, or the like), a group 5 element (V, Nb, Ta, or the like), a group 6 element (Cr, Mo, W, or the like) in the periodic table, Al, and Si, and (ii) at least one element selected from a group consisting of carbon, nitrogen, and boron. The sintered compact including such a fifth material has improved sintering property and more improved strength.

Specific examples of the above-described compound include TiC, TiN, $TiB_2$, TiCrN, ZrC, ZrN, $ZrB_2$, AlCrN, AlN, $AlB_2$, SiC, $Si_3N_4$, HfC, MfN, VC, VN, NbC, TaC, CrC, CrN, $Cr_2N$, MoC, WC, and the like. The fifth material can be composed of one of these compounds or can be composed of a combination of two or more of the compounds.

Preferably, such a fifth material has an average particle size of 0.05 μm to 5 μm. If the average particle size is less than 0.05 μm, the fourth material is likely to be aggregated to result in a tendency of insufficient sintering when mixed with other powder. If the average particle size is more than 5 μm, the strength of the sintered compact tends to be decreased.

Moreover, 5 volume % to 50 volume % of the fifth material is preferably contained in the sintered compact. When the ratio of the fifth material is less than 5 volume %, the strength of the sintered compact may not be sufficiently improved. On the other hand, when the ratio of the fifth material is more than 50 volume %, the ratio of the high-hardness cBN is decreased to presumably result in decreased hardness of the sintered compact. A more preferable ratio of the fifth material is 10 volume % to 30 volume %.

It should be noted that the average particle size and content of the fifth material can be found by the same method for the method for the first material.

<Application>

The sintered compact of the present embodiment can be used suitably for a cutting tool or the like. Examples of the cutting tool include a drill, an end mill, an indexable cutting insert for drill, an indexable cutting insert for end mill, an indexable cutting insert for milling, an indexable cutting insert for turning, a metal saw, a gear cutting tool, a reamer, a tap, a cutting bite, and the like.

The above cutting tool may be entirely constituted of the sintered compact of the present embodiment, or may be partially (for example, edge portion) constituted of the sintered compact of the present embodiment. Moreover, a coating film may be formed on a surface of such a cutting tool.

It should be noted that examples of the application other than the cutting tool include a friction stir tool and the like.

<Production Method>

The sintered compact of the present embodiment can be produced by employing a conventionally known production method, apart from preparing the second material (precursor) as follows.

That is, for example, the first material, the second material (precursor) prepared as described below, the third material, and other component(s) (such as a sintering auxiliary agent, the fourth material, the fifth material, and/or the like) as required are mixed with one another using a bead mill, a ball mill, or the like. Next, sintering is performed for 10 minutes to 60 minutes at a temperature of 1300° C. to 1700° C. and a pressure of 10 MPa to 7 GPa, thereby obtaining the sintered compact. Particularly preferably, the sintering is performed at a pressure of 4 GPa to 7 GPa. Although a sintering method is not particularly limited, spark plasma sintering (SPS), hot press, ultra-high pressure press, or the like can be used.

Here, the second material (precursor) can be obtained using a below-described neutralization co-precipitation method or a sol-gel method.

(Neutralization Co-Precipitation Method)

The neutralization co-precipitation method is a method including the following steps A and B. Such a method is described in a paper (J. Jpn. Soc. Powder Power Metallurgy, Vol. 60, No. 10, P428-435) published in 2013.

Step A: a step of preparing a mixed solution by using zirconium salt, yttrium salt, and aluminum salt such that a molar ratio of zirconia ($ZrO_2$) and yttria ($Y_2O_3$) is 98.2:1.8 to 98.8:1.2 and a molar ratio of zirconia having added yttria and alumina ($Al_2O_3$) is 50:50 to 90:10. It should be noted that in the description above, yttria ($Y_2O_3$) is illustrated as an oxide dissolved in a solid state in zirconia ($ZrO_2$); however, the oxide is not limited only to this.

Step B: a step of preparing $Y_2O_3$-stabilized $ZrO_2$—$Al_2O_3$ solid solution powder (second material precursor) by (i) neutralizing the mixed solution obtained in step A by adding alkali thereto to obtain a precipitate by way of co-precipitation of zirconium, yttrium, and aluminum, (ii) drying the precipitate, (iii) performing heat treatment at 650° C. to 750° C. for 7 hours to 12 hours, and then (iv) performing calcination at 850° C. to 950° C. for 0.5 hour to 3 hours.

Here, examples of the zirconium salt in step A include zirconium oxychloride ($ZrOCl_2$), zirconium oxynitrate ($ZrO(NO_3)_2$), and the like. Examples of the yttrium salt include yttrium chloride ($YCl_3$), yttrium nitrate ($Y(NO_3)_3$), and the like. Examples of the aluminum salt include aluminum chloride ($AlCl_3$) and the like. Moreover, examples of a solvent for the mixed solution include nitric acid, hydrochloric acid, and the like.

(Sol-Gel Method)

The sol-gel method is a method including the following step X. Such a method is, for example, described in the paper (J. Jpn. Soc. Powder Power Metallurgy, Vol. 58, No. 12, P727-732) published in 2011.

Step X: a step of preparing crystalline $ZrO_2$ solid solution powder (second material precursor) by (i) preparing amorphous solid solution powder of $ZrO_2$ having 0.3 to 1.7 mol % of $Y_2O_3$ added thereto, i.e., $ZrO_2$ (99.7 mol % to 98.3 mol % of $ZrO_2$—0.3 mol % to 1.7 mol % of $Y_2O_3$)—10 mol % to 50 mol % of $Al_2O_3$ using the sol-gel method, and (ii) calcinating the obtained amorphous solid solution powder at not less than a crystallization temperature.

(Other Methods)

The second material (precursor) of the present embodiment can be obtained by a method other than the two methods described above. That is, partially stabilized $ZrO_2$ and $Al_2O_3$ are mixed with each other in a solvent such as ethanol using a grinder such as a bead mill or a ball mill, thereby obtaining a slurry. Next, granulation is performed using this slurry, thereby obtaining the second material (precursor). Granulation means is not particularly limited, such as melt granulation or spray granulation.

It should be noted that the strength of the granulated material (second material (precursor)) thus obtained can be improved by the following method:

(1) performing sintering in a heat treatment furnace (for example, at 1000° C. in vacuum for 3 hours); or (2) adding 10 mass % of a binder (a general binder such as PVB (polyvinyl butyral)) to the slurry, which is in a stage prior to the granulated material.

With each of the methods, the second material (precursor) can be prepared. The second material is an oxide of zirconium in the sintered compact obtained using the second material (precursor) thus prepared, and includes cubic $ZrO_2$ and ZrO.

It should be noted that as described above, the cubic $ZrO_2$ may have $Al_2O_3$ and $Y_2O_3$ dissolved in a solid state. In this case, the contents of the oxides other than $ZrO_2$ such as $Al_2O_3$ and $Y_2O_3$ can be identified simultaneously upon checking the content of the second material.

EXAMPLES

While the present invention will be described in more detail hereinafter with reference to Examples, the present invention is not limited thereto.

Example 1

[Production of Sintered Compact No. 1-1]

A sintered compact No. 1-1 was produced as follows.

First, as raw materials, the following materials were prepared: 55 volume % of the first material (cBN having an average particle size of 2 μm); 23 volume % of the second material precursor (having an average particle size of 0.1 μm); 15 volume % of the third material (α-$Al_2O_3$ having an average particle size of 0.5 μm); and 7 volume % of metallic Al (having an average particle size of 2.0 μm) serving as a sintering auxiliary agent.

As described above, the second material precursor can be produced by the following method based on the paper (J. Jpn. Soc. Powder Power Metallurgy, Vol. 60, No. 10, P428-435) published in 2013.

Specifically, first, zirconium oxychloride ($ZrOCl_2.8H_2O$), aluminum chloride ($AlCl_3$), and yttrium chloride ($YCl_3$) are added to water to prepare a mixed aqueous solution such that a molar ratio of $ZrO_2$ and $Y_2O_3$ satisfies "$ZrO_2:Y_2O_3$=98.5:1.5" and a molar ratio of $ZrO_2$ having $Y_2O_3$ added thereto and $Al_2O_3$ satisfies "($ZrO_2$ having $Y_2O_3$ added thereto):$Al_2O_3$=75:25".

Next, an aqueous ammonia solution is added to this mixed aqueous solution to co-precipitate Zr, Y, and Al through simultaneous neutralization, and the obtained precipitate is filtered, is washed by water, and is dried, thereby preparing amorphous hydrated zirconia (75 mol % (98.5 mol % of $ZrO_2$—1.5 mol % of $Y_2O_3$)—25 mol % of $Al_2O_3$) solid solution powder.

Then, the obtained solid solution powder is calcinated (thermally treated) at 700° C. in air for 9 hours, and is further calcinated at 900° C. for 1 hour, thereby obtaining crystalline $ZrO_2$ (having $Al_2O_3$ and $Y_2O_3$ dissolved in a solid state) powder, which is the second material precursor. This second material precursor is partially stabilized $ZrO_2$ in which 15 volume % of $Al_2O_3$ is dissolved in a solid state relative to the whole of the second material precursor.

Next, the raw material powder prepared as described above (i.e., the first material, the second material precursor, the third material, and the sintering auxiliary agent) was mixed using a ball mill, thereby obtaining a mixture. Next, a capsule made of Nb was filled with the mixture, was set in a container of an ultra-high pressure generator, and was sintered at a sintering pressure of 7 GPa and a sintering temperature of 1500° C. for 15 minutes, thereby obtaining a sintered compact.

As a result of measuring the X-ray diffraction intensity of the obtained sintered compact using an X-ray diffractometer (manufacturer: Rigaku Corporation; model: MiniFlex600; analysis software: PDXL2), it was confirmed that cubic boron nitride (cBN), cubic $ZrO_2$, α-$Al_2O_3$, ZrO, and $ZrB_2$ were generated. It is estimated that ZrO and $ZrB_2$ not included in the raw material powder were generated together with $Al_2O_3$ as a result of a reaction among the first material and second material precursor of the raw material and the metallic Al mixed as a sintering auxiliary agent.

Figure 1:
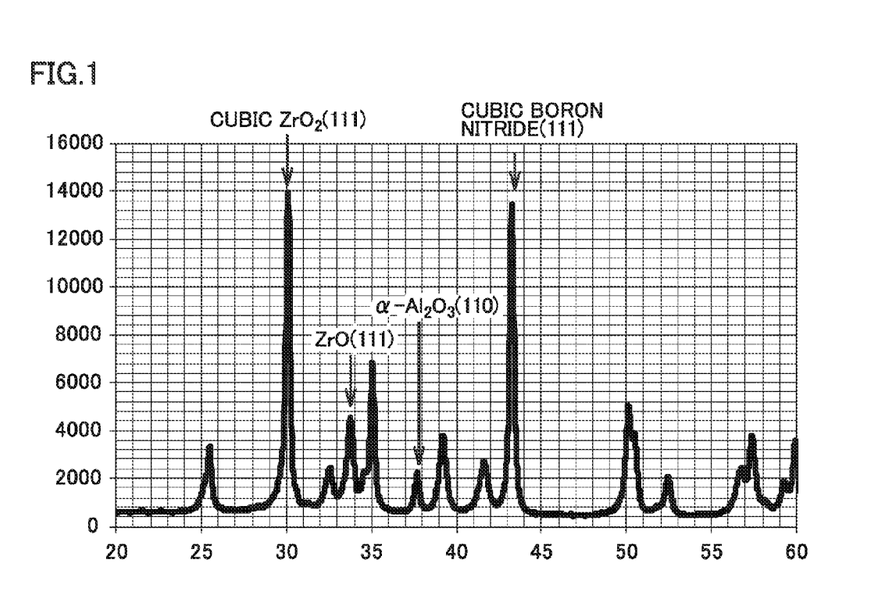
FIG. 1 is an X-ray diffraction intensity profile of a sintered compact of an Example.
Figure 2:
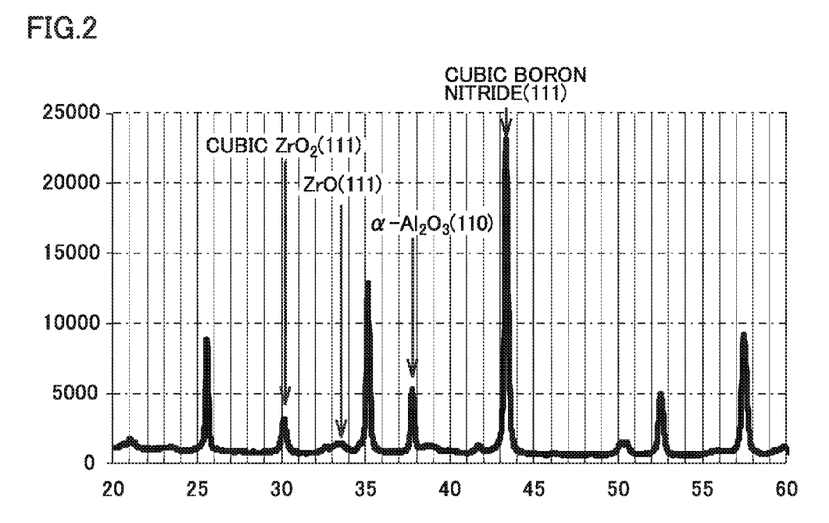
FIG. 2 is an X-ray diffraction intensity profile of a sintered compact of a Comparative Example.
Figure 3:
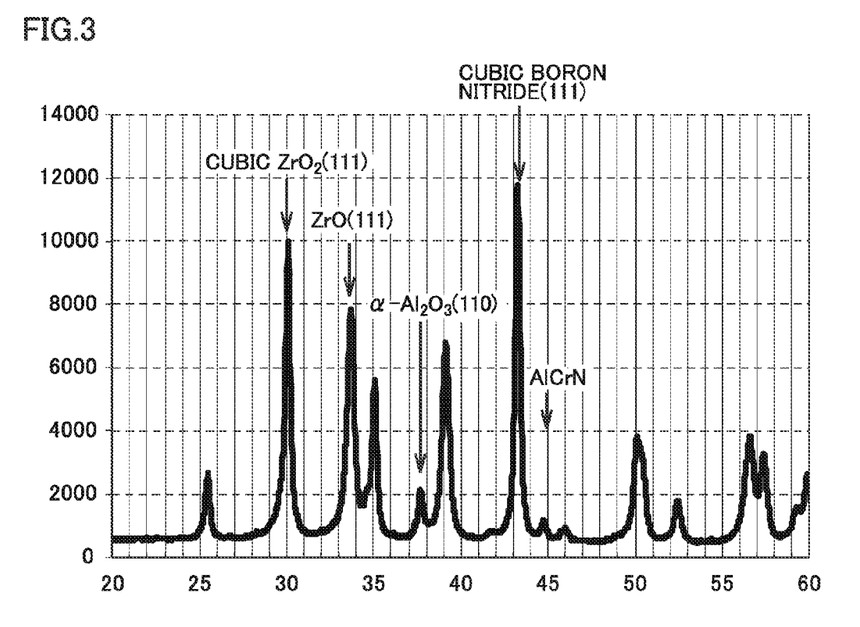
FIG. 3 is an X-ray diffraction intensity profile of a sintered compact of an Example different from the Example of FIG. 1.

An X-ray diffraction intensity profile of sintered compact No. 1-1 is shown in FIG. 1 (units in the vertical axis (intensity) and horizontal axis are "counts"; the same applies to FIG. 2 and FIG. 3 described below). It should be noted that through the X-ray diffraction, X-ray diffraction intensity ratios $I_{zro2}(111)/I_{al}(110)$ and $I_{zro}(111)/I_{al}(110)$ were found. Results thereof are shown in Table 1.

Moreover, the content of the cBN and the average particle size of each of the first material, the second material, and the third material included in sintered compact No. 1-1 were found as follows. That is, the equivalent circle diameters (particle sizes) of the first material, the second material, and the third material and the content were calculated by (i) performing a CP process to the sintered compact as described above, (ii) observing the resulting cross section with an SEM, and (iii) performing a binarization process using image analysis software (trademark: "WinROOF ver.6.5.3" provided by Mitani Corporation). As a result, the content and average particle size of the cBN substantially coincide with the content and average particle size in the raw material. The average particle size of the second material was 0.05 μm, and the average particle size of the third material was 0.3 μm.

[Production of Sintered Compacts No. 1-2 to No. 1-4]

Sintered compacts No. 1-2 to No. 1-4 were produced in accordance with the same production method as the production method for sintered compact No. 1-1 except that respective contents of the second material precursor (illustrated as "second material" in Table 1 for convenience) and the third material in the raw material were changed as shown in Table 1. Then, the same X-ray diffraction as that for sintered compact No. 1-1 was performed. Results thereof are shown in Table 1.

[Production of Sintered Compact No. 1-5 as Comparative Example]

A sintered compact No. 1-5 was produced in the same manner as the production of sintered compact No. 1-1 except that (i) $ZrO_2$ powder in which commercially available stabilized zirconia (trademark: "TZ-8YS" provided by TOSOH) and partially stabilized zirconia (trademark: "TZ-3Y" provided by TOSOH) were mixed at a ratio of 1:1 was used instead of the second material precursor used for sintered compact No. 1-1, and (ii) the ratio of the third material was changed.

Then, the same X-ray diffraction as that for sintered compact No. 1-1 was performed. The result is shown in FIG. 2 (X-ray diffraction intensity profile of sintered compact No. 1-5) and Table 1. It should be noted that for convenience, Table 1 describes a total content of the stabilized zirconia and the partially stabilized zirconia in the column for the second material.

[Production of Sintered Compacts No. 1-6 and No. 1-7 as Comparative Example]

Sintered compacts No. 1-6 and No. 1-7 were produced by the same production method as that for sintered compact No. 1-1 except that (i) $ZrO_2$ powder was used for sintered compact No. 1-5 instead of the second material precursor used in sintered compact No. 1-1, (ii) the ratio thereof was set as described in Table 1, (iii) the ratio of the third material was changed, and (iv) the sintering auxiliary agent (metallic Al) was not added. Then, the same X-ray diffraction as that for sintered compact No. 1-1 was performed. Results thereof are shown in Table 1.

It should be noted that regarding each of these sintered compacts, for convenience, Table 1 describes a total content of the stabilized zirconia and the partially stabilized zirconia in the column for the second material.

[Cutting Test]

Sintered compacts No. 1-1 to No. 1-7 produced as described above were used to manufacture cutting tools each with a shape of TCGW110208, a negative land angle of 15°, and a negative land width of 0.12 mm. Under the following cutting conditions, high-speed rotation cutting evaluation was performed using a machining center.

(Cutting Condition)
Cutting speed: 1000 m/min.
Feeding speed: 0.35 mm/rev.
Depth of cut: 0.3 mm
Coolant: Wet type (20-times diluted emulsion).
(Machining Center)
NV5000 α1A/40 (provided by DMG MORI Co., Ltd).
(Workpiece)
Composition: centrifugal cast iron (FC250 (gray cast iron) having dense pearlite, dendrite structure, and the like)
Shape: Cylindrical (outer diameter φ of 85 mm; inner diameter φ of 75 mm).

(Test Condition)

A maximum flank wear amount (μm) after cutting for 4.0 km was measured and a chipping life until occurrence of chipping of not less than 0.2 mm was measured. The results are shown in Table 1 (the former is indicated in the column of "maximum flank wear amount" and the latter is indicated in the column of "chipping life").

TABLE 1

| Sintered Compact | Contents in Raw Material (Volume %) | | | X-Ray Diffraction Intensity Ratio | | Cutting Test | |
|---|---|---|---|---|---|---|---|
| | First Material | Second Material | Third Material | $I_{zro2}(111)/I_{al}(110)$ | $I_{zro}(111)/I_{al}(110)$ | Maximum Flank Wear Amount | Chipping Life |
| No. 1-1 | 55 | 23 | 15 | 7.8 | 2.8 | 0.123 mm | 13.0 km |
| No. 1-2 | 55 | 10 | 28 | 1.1 | 1.4 | 0.115 mm | 12.5 km |
| No. 1-3 | 55 | 7 | 31 | 0.9 | 1.3 | 0.110 mm | 10.2 km |
| No. 1-4 | 55 | 38 | 0 | 29.7 | 3.0 | 0.164 mm | 11.2 km |
| No. 1-5 | 55 | 3 | 35 | 0.6 | 0.3 | 0.104 mm | 5.1 km |
| No. 1-6 | 55 | 45 | 0 | 38.8 | 0.2 | 0.236 mm | 4.8 km |
| No. 1-7 | 55 | 32 | 13 | 26.5 | 0.1 | 0.225 mm | 9.2 km |

As apparent from Table 1, it could be confirmed that each of sintered compacts No. 1-1 to No. 1-4 of the Example had smaller maximum flank wear amount and more excellent wear resistance than those of sintered compacts No. 1-6 and No. 1-7 of the Comparative Example. Moreover, it could be confirmed that each of sintered compacts No. 1-1 to No. 1-4 of the Example had a longer chipping life and therefore had more excellent chipping resistance, i.e., had more excellent toughness than those of sintered compacts No. 1-5 to No. 1-7 of the Comparative Example. Thus, it could be confirmed that each of the sintered compacts of the Example had both high toughness and excellent wear resistance.

Example 2

Sintered compacts No. 2-1 to No. 2-4 were produced in the same manner as the production of sintered compacts No. 1-1 to No. 1-4 of Example 1 except that the second material precursor used in the sintered compacts No. 1-1 to No. 1-4 of Example 1 was replaced with a second material precursor A (for convenience, illustrated as "second material" in Table 2) produced using the sol-gel method described below.

[Production of Second Material Precursor A]

Second material precursor A can be produced by the following method (sol-gel method) based on the paper (J. Jpn. Soc. Powder Power Metallurgy, Vol. 58, No. 12, P727-732) published in 2011 as described above.

Specifically, first, Zr-i-$(OC_3H_7)_4$, Al$(OC_3H_7)_3$, and Y$(OC_3H_7)_3$ are treated for 2 hours in 2-propanol, and then $NH_4OH$ is added thereto. Next, reflux is performed at 78° C. for 24 hours, thereby obtaining a hydrolysis product. Then, this hydrolysis product is centrifuged and is then washed with hot water.

Then, the hydrolysis product thus washed is dried at 120° C. in vacuum, thereby obtaining an intermediate. Blending is performed at a blending ratio of 1.5 mol % of $Y_2O_3$ and 25 mol % of $Al_2O_3$ relative to $ZrO_2$. Then, the obtained intermediate (powder) is calcinated (thermally treated) at 700° C. in air for 9 hours, and is further calcinated at 900° C. for 1 hour, thereby obtaining crystalline $ZrO_2$ (having $Al_2O_3$ and $Y_2O_3$ dissolved in a solid state) powder, which is second material precursor A. This second material precursor A is partially stabilized $ZrO_2$ in which 15 volume % of $Al_2O_3$ was dissolved in a solid state relative to the whole of second material precursor A.

Then, as a result of measuring the X-ray diffraction intensities in sintered compacts No. 2-1 to No. 2-4 obtained in this way in the same manner as in Example 1, it was confirmed that cubic boron nitride (cBN), cubic $ZrO_2$, ZrO, α-$Al_2O_3$, and $ZrB_2$ were generated. It is estimated that ZrO and $ZrB_2$ not included in the raw material powder were generated together with $Al_2O_3$ as a result of a reaction among the first material and second material precursor A of the raw material and the metallic Al mixed as a sintering auxiliary agent.

It should be noted that through the X-ray diffraction, X-ray diffraction intensity ratios $I_{zro2}(111)/I_{al}(110)$ and $I_{zro}(111)/I_{al}(110)$ were found. Results thereof are shown in Table 2.

Moreover, the results of performing the same cutting test as that in Example 1 using sintered compacts No. 2-1 to No. 2-4 are shown in Table 2.

TABLE 2

| Sintered Compact | Contents in Raw Material (Volume %) | | | X-Ray Diffraction Intensity Ratio | | Cutting Test | |
|---|---|---|---|---|---|---|---|
| | First Material | Second Material | Third Material | $I_{zro2}(111)/I_{al}(110)$ | $I_{zro}(111)/I_{al}(110)$ | Maximum Flank Wear Amount | Chipping Life |
| No. 2-1 | 55 | 23 | 15 | 5.0 | 2.5 | 0.135 mm | 12.8 km |
| No. 2-2 | 55 | 10 | 28 | 1.2 | 1.6 | 0.122 mm | 12.3 km |
| No. 2-3 | 55 | 7 | 31 | 0.9 | 0.3 | 0.121 mm | 9.9 km |
| No. 2-4 | 55 | 38 | 0 | 30.0 | 2.9 | 0.150 mm | 10.8 km |

As apparent from Table 2, it could be confirmed that sintered compacts No. 2-1 to No. 2-4 of the Example had small maximum flank wear amount and excellent wear resistance, and had long chipping life and excellent chipping resistance (i.e., had excellent toughness) as with sintered compacts No. 1-1 to No. 1-4 of Example 1. Thus, it could be confirmed that each of the sintered compacts of the Example 2 had both high toughness and excellent wear resistance.

Example 3

Sintered compacts No. 3-1 to No. 3-6 were produced in the same manner as sintered compact No. 1-1 of Example 1 except that the contents of the first material, the second material precursor, and the third material in the raw material of sintered compact No. 1-1 of Example 1 were replaced with contents in the raw material as shown in Table 3 (for convenience, the second material precursor is indicated as "second material" in Table 3).

As a result of measuring the X-ray diffraction intensities in sintered compacts No. 3-1 to No. 3-6 obtained in this way in the same manner as in Example 1, it was confirmed that cubic boron nitride (cBN), cubic $ZrO_2$, ZrO, $\alpha$-$Al_2O_3$, and $ZrB_2$ were generated. It is estimated that ZrO and $ZrB_2$ not included in the raw material powder were generated together with $Al_2O_3$ as a result of a reaction among the first material and second material precursor of the raw material and the metallic Al mixed as a sintering auxiliary agent.

It should be noted that through the X-ray diffraction, X-ray diffraction intensity ratios $I_{zro2}(111)/I_{al}(110)$ and $I_{zro}(111)/I_{al}(110)$ were found. Results thereof are shown in Table 3.

Moreover, the results of performing the same cutting test as that in Example 1 using sintered compacts No. 3-1 to No. 3-6 are shown in Table 3.

in this way in the same manner as in Example 1, it was confirmed that cubic boron nitride (cBN), cubic $ZrO_2$, ZrO, $\alpha$-$Al_2O_3$, and $ZrB_2$, and the fourth material and/or the fifth material described in Table 4 were generated. It is estimated that ZrO and $ZrB_2$ not included in the raw material powder were generated together with $Al_2O_3$ as a result of a reaction among the first material and second material precursor of the raw material and the metallic Al mixed as a sintering auxiliary agent.

It should be noted that through the X-ray diffraction, X-ray diffraction intensity ratios $I_{zro2}(111)/I_{al}(110)$ and $I_{zro}(111)/I_{al}(110)$ were found, which fell within the following ranges: $1.1 \leq I_{zro2}(111)/I_{al}(110) \leq 10$, and $1 \leq I_{zro}(111)/I_{al}(110) \leq 2.5$. It should be noted that an X-ray diffraction intensity profile of sintered compact No. 4-4 is shown in FIG. 3. As apparent from a comparison between FIG. 1 and FIG. 3, it is understood that strong peaks of cubic $ZrO_2$ (111) and ZrO (111) are observed irrespective of the addition of the fifth material.

[Cutting Test]

Sintered compacts No. 4-1 to No. 4-12 produced as described above were used to manufacture cutting tools each with a shape of TCGW110208, a negative land angle of 15°, and a negative land width of 0.12 mm. Under the following cutting conditions, high-speed rotation cutting evaluation was performed using a machining center.

(Cutting Condition)

Cutting speed: 750 m/min.

Feeding speed: 0.25 mm/rev.

TABLE 3

| Sintered Compact | Contents in Raw Material (Volume %) | | | X-Ray Diffraction Intensity Ratio | | Cutting Test | |
|---|---|---|---|---|---|---|---|
| | First Material | Second Material | Third Material | $I_{zro2}(111)/I_{al}(110)$ | $I_{zro}(111)/I_{al}(110)$ | Maximum Flank Wear Amount | Chipping Life |
| No. 3-1 | 10 | 68 | 15 | 16.5 | 0.32 | 0.175 mm | 9.5 km |
| No. 3-2 | 20 | 58 | 15 | 12.0 | 0.52 | 0.153 mm | 10.9 km |
| No. 3-3 | 45 | 33 | 15 | 8.9 | 1.10 | 0.097 mm | 12.7 km |
| No. 3-4 | 60 | 18 | 15 | 4.5 | 2.50 | 0.132 mm | 11.7 km |
| No. 3-5 | 80 | 10 | 3 | 14.1 | 0.40 | 0.190 mm | 9.3 km |
| No. 3-6 | 85 | 8 | 0 | 20.3 | 0.30 | 0.213 mm | 9.5 km |

As apparent from Table 3, it could be confirmed that sintered compacts No. 3-1 to No. 3-6 of the Example had small maximum flank wear amount and excellent wear resistance, and had long chipping life and excellent chipping resistance (i.e., had excellent toughness) as with sintered compacts No. 1-1 to No. 1-4 of Example 1. Thus, it could be confirmed that each of the sintered compacts of Example 3 had both high toughness and excellent wear resistance.

Example 4

Sintered compacts No. 4-1 to No. 4-12 were produced in the same manner as sintered compact No. 1-1 of Example 1 except that the content (23 volume %) of the second material precursor as the raw material of sintered compact No. 1-1 of Example 1 was replaced with 18 volume % of the second material precursor and 5 volume % of the fourth material and/or fifth material described in Table 4.

Then, as a result of measuring the X-ray diffraction intensities in sintered compacts No. 4-1 to No. 4-12 obtained Depth of cut: 0.3 mm Coolant: Wet type (20-times diluted emulsion).

(Machining Center)

NV5000 α1A/40 (provided by DMG MORI Co., Ltd).

(Workpiece)

Composition: centrifugal cast iron (FC250 (gray cast iron) having dense pearlite, dendrite structure, and the like)

Shape: Cylindrical (outer diameter φ of 80 mm; inner diameter φ of 70 mm).

(Test Condition)

The maximum flank wear amount (μm) after cutting for 7.0 km was measured and a chipping life until occurrence of chipping of not less than 0.2 mm was measured. The results are shown in Table 4 (the former is indicated in the column of "maximum flank wear amount" and the latter is indicated in the column of "chipping life").

TABLE 4

| Sintered Compact | Fourth Material (Volume %) | | | | Fifth Material (Volume %) | | | | | | | Cutting Test | |
|---|---|---|---|---|---|---|---|---|---|---|---|---|---|
| | $Y_2O_3$ | CeO | MgO | HfO | AlCrN | TiCrN | ZrC | ZrN | TiC | TiN | $Si_3N_4$ | Maximum Flank Wear Amount | Chipping Life |
| No. 4-1  | 5 | — | — | — | — | — | — | — | — | — | — | 0.165 mm | 14.1 km |
| No. 4-2  | — | 2.5 | 2.5 | — | — | — | — | — | — | — | — | 0.172 mm | 13.8 km |
| No. 4-3  | — | — | — | 5 | — | — | — | — | — | — | — | 0.175 mm | 13.7 km |
| No. 4-4  | — | — | — | — | 5 | — | — | — | — | — | — | 0.152 mm | 15.3 km |
| No. 4-5  | — | — | — | — | — | 5 | — | — | — | — | — | 0.161 mm | 14.7 km |
| No. 4-6  | — | — | — | — | — | — | 5 | — | — | — | — | 0.162 mm | 14.8 km |
| No. 4-7  | — | — | — | — | — | — | — | 5 | — | — | — | 0.166 mm | 14.6 km |
| No. 4-8  | — | — | — | — | — | — | — | — | 5 | — | — | 0.157 mm | 14.8 km |
| No. 4-9  | — | — | — | — | — | — | — | — | — | 5 | — | 0.173 mm | 13.8 km |
| No. 4-10 | — | — | — | — | — | — | — | — | — | — | 5 | 0.183 mm | 12.6 km |
| No. 4-11 | 3 | — | — | — | 2 | — | — | — | — | — | — | 0.15 mm  | 15.1 km |
| No. 4-12 | 3 | — | — | — | — | — | — | — | 2 | — | — | 0.162 mm | 15.1 km |

As apparent from Table 4, it could be confirmed that sintered compacts No. 4-1 to No. 4-12 of the Example had small maximum flank wear amount and excellent wear resistance, and had long chipping life and excellent chipping resistance (i.e., had excellent toughness) as with sintered compacts No. 1-1 to No. 1-4 of Example 1. Thus, it could be confirmed that each of the sintered compacts of Example 4 had both high toughness and excellent wear resistance.

Heretofore, the embodiments and examples of the present invention have been illustrated, but it has been initially expected to appropriately combine configurations of the embodiments and examples.

The embodiments disclosed herein are illustrative and non-restrictive in any respect. The scope of the present invention is defined by the terms of the claims, rather than the embodiments described above, and is intended to include any modifications within the scope and meaning equivalent to the terms of the claims.

The invention claimed is:

1. A sintered compact comprising:
   a first material that is cubic boron nitride;
   a second material that is an oxide of zirconium; and
   a third material that is an oxide of aluminum,
   the second material including cubic $ZrO_2$ and ZrO,
   the third material including $\alpha$-$Al_2O_3$,
   the sintered compact satisfying the following relation:

$0.9 \leq I_{zro2}(111)/I_{al}(110) \leq 30$; and $0.3 \leq I_{zro}(111)/I_{al}(110) \leq 3$, where $I_{al}(110)$, $I_{zro2}(111)$, and $I_{zro}(111)$ respectively represent X-ray diffraction intensities of a (110) plane of the $\alpha$-$Al_2O_3$, a (111) plane of the cubic $ZrO_2$, and a (111) plane of the ZrO.

2. The sintered compact according to claim 1, wherein the $I_{al}(110)$, the $I_{zro2}(111)$ and the $I_{zro}(111)$ satisfy the following relations:

$1.1 \leq I_{zro2}(111)/I_{al}(110) \leq 10$; and $1 \leq I_{zro}(111)/I_{al}(110) \leq 2.5$.

3. The sintered compact according to claim 1, wherein the cubic $ZrO_2$ includes partially stabilized $ZrO_2$.

4. The sintered compact according to claim 1, wherein the cubic $ZrO_2$ has $Al_2O_3$ and $Y_2O_3$ dissolved in a solid state.

5. The sintered compact according to claim 1, wherein the sintered compact includes 20 volume % to 80 volume % of the first material.

6. The sintered compact according to claim 1, wherein the sintered compact includes 30 volume % to 60 volume % of the first material.

7. The sintered compact according to claim 1, further comprising a fourth material, wherein
   the fourth material is at least one selected from a group consisting of magnesium oxide, cerium oxide, yttrium oxide, and hafnium oxide.

8. The sintered compact according to claim 1, further comprising a fifth material, wherein
   the fifth material is at least one compound composed of (i) at least one element selected from a group consisting of a group 4 element, a group 5 element, a group 6 element in a periodic table, Al, and Si, and (ii) at least one element selected from a group consisting of carbon, nitrogen, and boron.

9. A cutting tool comprising the sintered compact recited in claim 1.

* * * * *